J. SCOTT.
BRAKE FOR CARS.
APPLICATION FILED JUNE 19, 1917.

1,254,440.  Patented Jan. 22, 1918.

UNITED STATES PATENT OFFICE.

JASPER SCOTT, OF CHARLESTON, WEST VIRGINIA.

BRAKE FOR CARS.

1,254,440.  Specification of Letters Patent.  Patented Jan. 22, 1918.

Application filed June 19, 1917. Serial No. 175,659.

*To all whom it may concern:*

Be it known that I, JASPER SCOTT, a citizen of the United States, residing at Charleston, in the county of Kanawha and State of West Virginia, have invented certain new and useful Improvements in Brakes for Cars; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in a device for checking cars and consists essentially in the provision of a frictional braking means, in the form of a rope which is coiled several times about the axle of a car and is adapted to be attached at one end to the brake lever of the car.

My invention comprises various details of construction, combinations and arrangements of parts which will be hereinafter fully described, shown in the accompanying drawings and then specifically defined in the appended claim.

My invention is illustrated in the accompanying drawings which, with the letters of reference marked thereon, form a part of this specification and in which.

Figure 1:
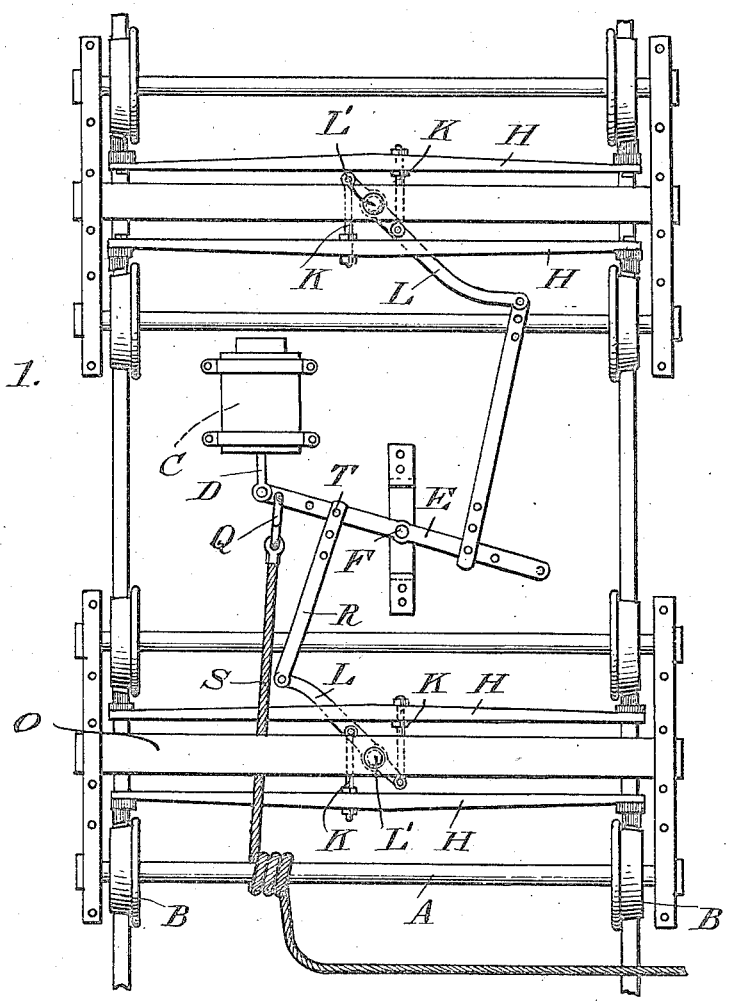
Figure 1 is a top plan view showing the application of my braking device to the running gear of a car.
Figure 2:
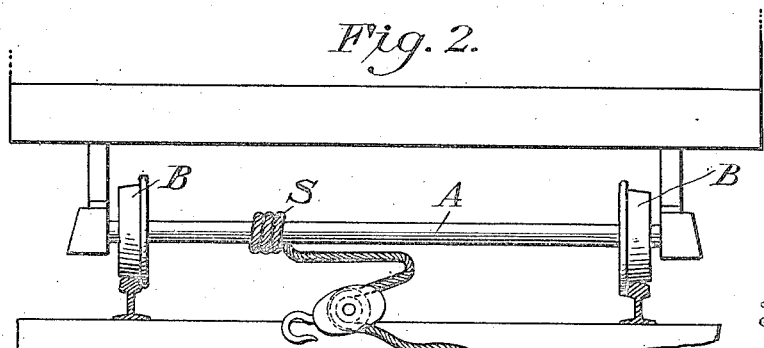
Fig. 2 is an end elevation of the portion of a car with the braking device attached.

Reference now being had to the details of the drawings by letter:

A designates the forward axle of a car on which the wheels B are mounted and C is a brake cylinder with a piston D mounted therein and to which a bar E is pivotally connected, which in turn is pivotally mounted upon the pin F. The brake beams H are pivotally connected through the medium of the rods K with the lever L, which is pivoted at L', upon the cross beam O, and in turn is pivotally connected to the adjustable bar R which is connected to the bar E through the medium of the pin T. A rope S is provided with a hook Q at one end and adapted to engage over the bar E and said rope is passed one or more times about the axle, as shown clearly in the drawings, in order to get a frictional grip thereon.

In operation, when it is desired to check the movement of the car, the hook is engaged over the bar E, thence wound about the axle, and the person holding on to the free end of the rope may regulate the friction intermediate the rope and the axle by holding the rope taut, or slacking it. As the rope winds about the axle the hook will cause the brake bar E to tilt and through its connection with the brake shoes upon the beams H will cause the shoes of the brake to frictionally engage the wheels of the car.

What I claim to be new is—

A truck device for checking cars, comprising, in combination with the truck of a car having cross beams, brake beams one upon either side of each cross beam, rods connected one to each brake beam and movable in opposite directions, a lever pivotally mounted upon each cross beam and having pivotal connections with the ends of the adjacent rods which are mounted upon the brake beams, an oscillating lever between the trucks, and having pivotal link connections with said levers which are mounted upon the cross beams, a hook adjustably connected to said oscillating lever, and a rope fastened to the hook and adapted to be wound about the axle journaled in one of the trucks.

In testimony whereof I hereunto affix my signature in presence of two witnesses.

JASPER SCOTT.

Witnesses:
  M. F. STILES,
  M. G. DEADERICK.

Copies of this patent may be obtained for five cents each, by addressing the "Commissioner of Patents, Washington, D. C."